(12) United States Patent
Tanaka et al.

(10) Patent No.: US 11,309,807 B2
(45) Date of Patent: Apr. 19, 2022

(54) POWER CONVERSION SYSTEM AND POWER CONVERSION DEVICE

(71) Applicant: Mitsubishi Electric Corporation, Tokyo (JP)

(72) Inventors: Miwako Tanaka, Tokyo (JP); Hiroki Ishihara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/293,915

(22) PCT Filed: Jan. 11, 2019

(86) PCT No.: PCT/JP2019/000657
§ 371 (c)(1),
(2) Date: May 14, 2021

(87) PCT Pub. No.: WO2020/144841
PCT Pub. Date: Jul. 16, 2020

(65) Prior Publication Data
US 2022/0014116 A1  Jan. 13, 2022

(51) Int. Cl.
*H02J 3/18* (2006.01)
*H02M 7/64* (2006.01)
(Continued)

(52) U.S. Cl.
CPC ............... *H02M 7/64* (2013.01); *H02J 3/16* (2013.01); *H02J 3/18* (2013.01); *H02M 7/4807* (2013.01);
(Continued)

(58) Field of Classification Search
CPC .... H02M 7/64; H02M 7/4807; H02M 7/4833; H02M 7/48; H02M 1/0012;
(Continued)

(56) References Cited

U.S. PATENT DOCUMENTS

2008/0157728 A1*  7/2008  Toki ................. H02J 3/1864
                                                         323/210
2012/0134191 A1*  5/2012  Yoneda ............... H02J 3/383
                                                         363/131
(Continued)

FOREIGN PATENT DOCUMENTS

JP       2009-50119 A      3/2009
JP       5750790 B2         7/2015
(Continued)

OTHER PUBLICATIONS

Masahiro Watanabe; Katsuhiro Matsuda; Takafumi Futakami; Kenichiro Yamane; Ryo Egashira; "Control method for voltage regulator based on estimated amount of photovoltaic generation power"; Apr. 29, 2013; IEEE; pp. 1-4 (Year: 2013).*

(Continued)

*Primary Examiner* — Thienvu V Tran
*Assistant Examiner* — Shahzeb K Ahmad
(74) *Attorney, Agent, or Firm* — Xsensus LLP

(57) ABSTRACT

A power conversion device includes: a power converter circuit which converts a direct-current power, output from a decentralized power supply, into an alternating-current power, and outputs the alternating-current power to a power distribution grid; a voltage target value generation unit which removes a high-frequency variation from a root mean square of a voltage detected by a voltage detection unit to generate a voltage target value; a correction unit which corrects the voltage target value when the correction unit detects that the automatic voltage regulator has performed an action; and a command unit which, if the voltage at the point of interconnection detected by the voltage detection unit deviates from a voltage control deadband referenced to the voltage target value, commands the power converter (Continued)

circuit to output a reactive power based on a magnitude of the deviated amount of voltage.

14 Claims, 13 Drawing Sheets

(51) Int. Cl.
  *H02M 7/48* (2007.01)
  *H02M 7/483* (2007.01)
  *H02J 3/16* (2006.01)
  *H02J 3/38* (2006.01)
  *H02J 3/12* (2006.01)

(52) U.S. Cl.
  CPC ............ *H02M 7/4833* (2021.05); *H02J 3/12* (2013.01); *H02J 3/38* (2013.01)

(58) Field of Classification Search
  CPC .... H02M 1/0025; H02M 1/16; H02M 1/0019; H02J 3/12; H02J 3/16; H02J 3/18; H02J 3/38; Y02E 40/30
  See application file for complete search history.

(56) References Cited

U.S. PATENT DOCUMENTS

| | | | | |
|---|---|---|---|---|
| 2012/0235498 A1* | 9/2012 | Johnson | .................... | H02J 3/46 307/82 |
| 2014/0175887 A1* | 6/2014 | Shao | ......................... | H02J 4/00 307/72 |
| 2016/0233681 A1* | 8/2016 | Itaya | ......................... | H02J 3/46 |
| 2019/0334454 A1* | 10/2019 | Itoh | .................... | H02M 7/5395 |
| 2020/0274357 A1 | 8/2020 | Inoue et al. | | |
| 2021/0288499 A1* | 9/2021 | Martin | ....................... | H02J 3/50 |

FOREIGN PATENT DOCUMENTS

| | | |
|---|---|---|
| JP | 2015-177624 A | 10/2015 |
| JP | 2018196182 A * | 12/2018 |
| WO | 2016/121014 A1 | 8/2016 |

OTHER PUBLICATIONS

International Search Report and Written Opinion dated Mar. 5, 2019, received for PCT Application PCT/JP2019/000657, Filed on Jan. 11, 2019, 8 pages including English Translation.

* cited by examiner (a)

(b)

POWER CONVERSION SYSTEM AND POWER CONVERSION DEVICE

CROSS-REFERENCE TO RELATED APPLICATION

The present application is based on PCT filing PCT/JP2019/000657, filed Jan. 11, 2019, the entire contents of which are incorporated herein by reference.

TECHNICAL FIELD

The present invention relates to a power conversion system and a power conversion device.

BACKGROUND ART

Green energy-based power generation, such as a solar power system, generates power that varies from time to time, depending on natural conditions, such as a weather. For this reason, it is important to suppress fluctuations in voltage of the utility grid.

For example, the voltage control device disclosed in PTL 1 suppresses short-cycle fluctuations in voltage of the utility grid by reactive power compensation by a static var compensator, and suppresses long-cycle fluctuations in voltage of the utility grid by switching the taps of a step voltage regulator.

CITATION LIST

Patent Literature

PTL 1: WO2016/121014 A1

SUMMARY OF INVENTION

Technical Problem

The voltage control device disclosed in PTL 1 suppresses the short-cycle fluctuations by reactive power compensation by a reactive power compensator. However, the static var compensator is expensive.

Therefore, an object of the present invention is to provide a power conversion system and a power conversion device which can stabilize the fluctuations in voltage of a power distribution grid interconnected with a decentralized power supply system, without having to use a static var compensator.

Solution to Problem

The present invention is a power conversion system, including: an automatic voltage regulator installed in a power distribution grid; and at least one decentralized power supply system, the decentralized power supply system, including: a decentralized power supply; and a power conversion device, the power conversion device including: a power converter circuit to convert a direct-current power output from the decentralized power supply into an alternating-current power, and output the alternating-current power to the power distribution grid; a voltage detection unit to detect a voltage at a point of interconnection between the power converter circuit and the power distribution grid; a voltage target value generation unit to remove a high-frequency variation from a root mean square of the voltage detected by the voltage detection unit to generate a voltage target value; a correction unit to correct the voltage target value when the automatic voltage regulator has performed an action; and a command unit to command, when the voltage at the point of interconnection detected by the voltage detection unit deviates from a voltage control deadband referenced to the voltage target value, the power converter circuit to output a reactive power based on of a magnitude of the deviated amount of voltage.

Advantageous Effects of Invention

According to the present invention, when the automatic voltage regulator has performed an action, the voltage target value is corrected, and, if the voltage at the point of interconnection deviates from the voltage control deadband referenced to the voltage target value, a reactive power is output based on the magnitude of the deviated amount of voltage. This allows fluctuations in voltage of the power distribution grid interconnected with the decentralized power supply system to be stabilized, without having to use a static var compensator.

DESCRIPTION OF EMBODIMENTS

Figure 1:
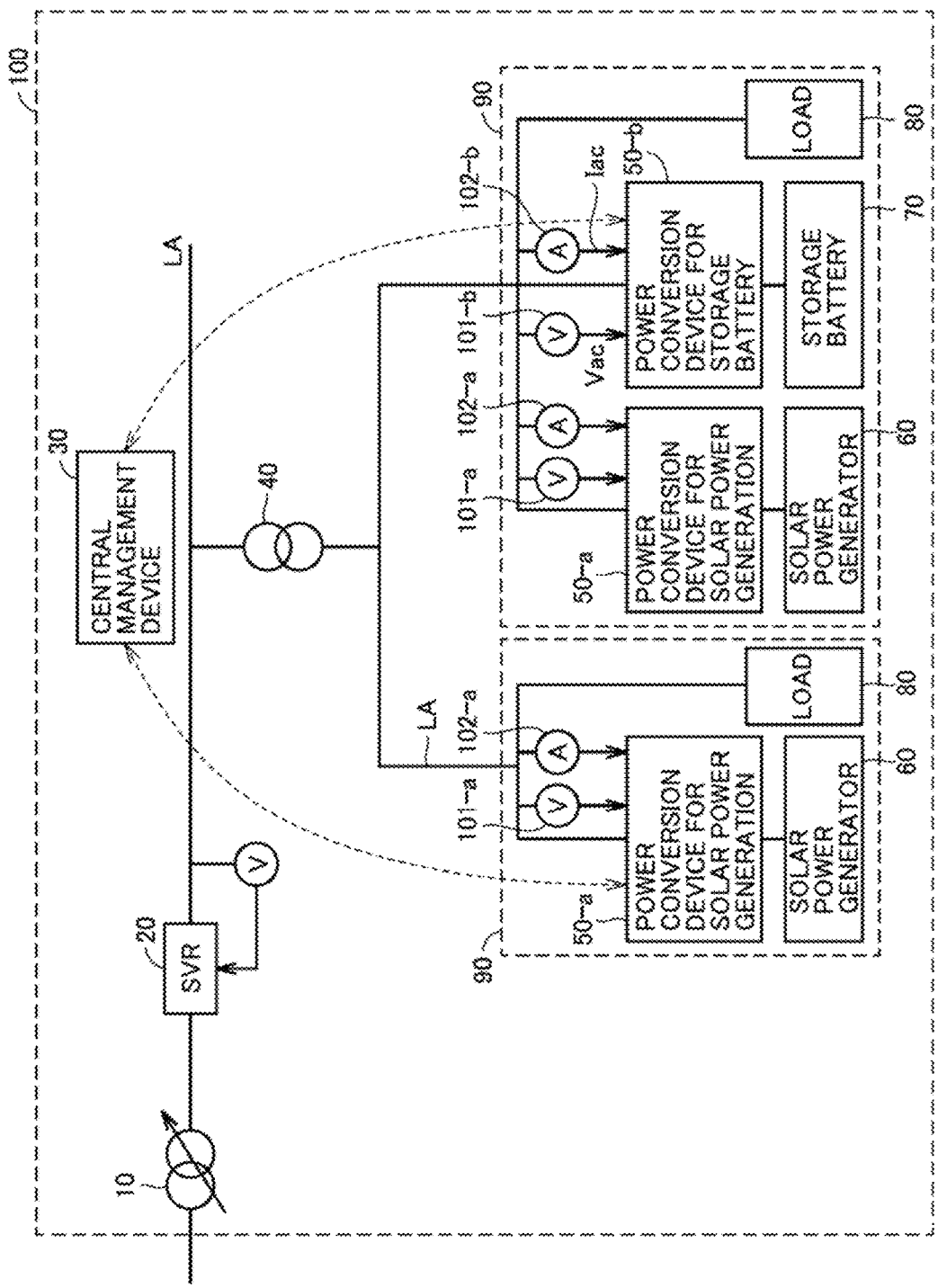
FIG. 1 is a schematic view of a power conversion system 100 according to Embodiment 1.

Embodiments will be described in detail, with reference to the accompanying drawings. Note that the same reference sign is used to refer to the same or corresponding component in the drawings, and description thereof will not be repeated.

Embodiment 1

FIG. 1 is a schematic view of a power conversion system 100 according to Embodiment 1.

Referring to FIG. 1, power conversion system 100 includes a substation 10, a step voltage regulator (SVR) 20, a pole transformer 40, and at least one decentralized power supply system 90. Step voltage regulator 20 and pole transformer 40 are installed in a power distribution grid LA. The power sent from substation 10 is supplied to a load 80 via step voltage regulator 20 and pole transformer 40.

If an alternating-current (AC) effective voltage of power distribution grid LA exceeds the upper limit voltage or falls below the lower limit voltage for an operating voltage of SVR 20 for a period of time, step voltage regulator (SVR) 20 switches taps to change the transformer ratio between the primary side and the secondary side to automatically adjust the voltage of power distribution grid LA to a proper value. A voltage width on the secondary side that is varied by SVR 20 switching the taps one time is referred to as an SVR voltage step width ΔVsvr. An upper limit voltage VU and a lower limit voltage VL for the operating voltage of SVR 20 are determined by a reference voltage VR and a voltage control deadband Vdead (SVR), where VU=VR+Vdead (SVR) and VL=VR−Vdead (SVR). Here, the period of time can be, for example, about 45 seconds.

Decentralized power supply system 90 includes decentralized power supplies. Examples of the decentralized power supply include decentralized power supplies for customers having a photovoltaic device and a storage battery installed therein, a large number of power generating devices using green energy, such as solar power generation, and a mage solar power system formed of multiple storage batteries.

Figure 2:
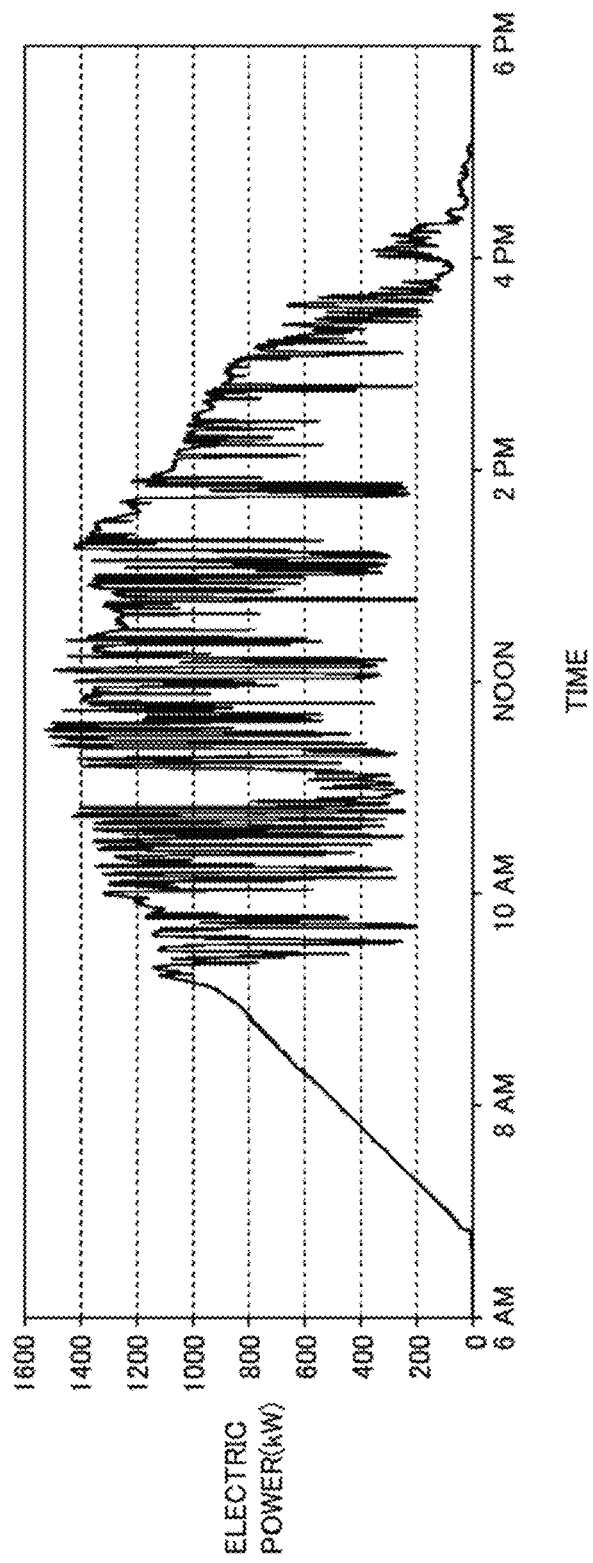
FIG. 2 is a diagram showing example power generation by solar power generation in a day.

FIG. 2 is a diagram showing example power generation by solar power generation in a day.

As shown in FIG. 2, the power generation by solar power generator 60 changes from time to time due to variations in insolation. Thus, in a power distribution grid interconnected with large-capacity decentralized power supplies, the voltage varies in a short cycle. As a result, the number of actions performed by SVR 20 increases. Since SVR 20 mechanically switches the taps, an increased number of actions performed by SVR 20 shortens the device lifetime. It is not desirable that the number of times SVR 20 performs an action is increased due to the variations in electric power of the decentralized power supplies.

Decentralized power supply system 90 includes, at least, a solar power generator 60, which is a decentralized power supply, a power conversion device 50-a for solar power generation, a load 80, a voltage detector 101-a for solar power generation, and a current detector 102-a for solar power generation. Decentralized power supply system 90 may further include a storage battery 70, which is a decentralized power supply, a power conversion device 50-b for storage battery, a voltage detector 101-b for storage battery, and a current detector 102-b for storage battery.

Power conversion device 50-a for solar power generation and power conversion device 50-b for storage battery will be collectively described as a power conversion device 50. Voltage detector 101-a for solar power generation and voltage detector 101-b for storage battery will be collectively described as a voltage detector 101. Current detector 102-a for solar power generation and current detector 102-b for storage battery will be collectively described as a current detector 102. Solar power generator 60 and storage battery 70 will be collectively described as a decentralized power supply.

Voltage detector 101 measures an alternating-current (AC) voltage Vac at a point of interconnection between power conversion device 50 and power distribution grid LA. Current detector 102 measures an AC current Iac at the point of interconnection between power conversion device 50 and power distribution grid LA.

While FIG. 1 illustrates two decentralized power supply systems 90 interconnected with power distribution grid LA, at least one decentralized power supply system 90 may be interconnected with power distribution grid LA.

A central management device 30 manages a state of power distribution grid LA. Central management device 30 monitors the flow of the utility grid. Central management device 30 has functionality of bi-directional data communications with power conversion device 50 included in decentralized power supply system 90. Central management device 30 periodically receives information on SVR 20, voltage control deadband Vdead for power conversion device 50, and the voltage and the current at the point of interconnection between power conversion device 50 and power distribution grid LA. Central management device 30 determines voltage control deadband Vdead, based on an impedance ZL and a voltage distribution of power distribution grid LA in a smaller range than voltage control deadband Vdead (SVR) for SVR. In other words, Vdead (SVR)>Vdead is satisfied.

Figure 3:
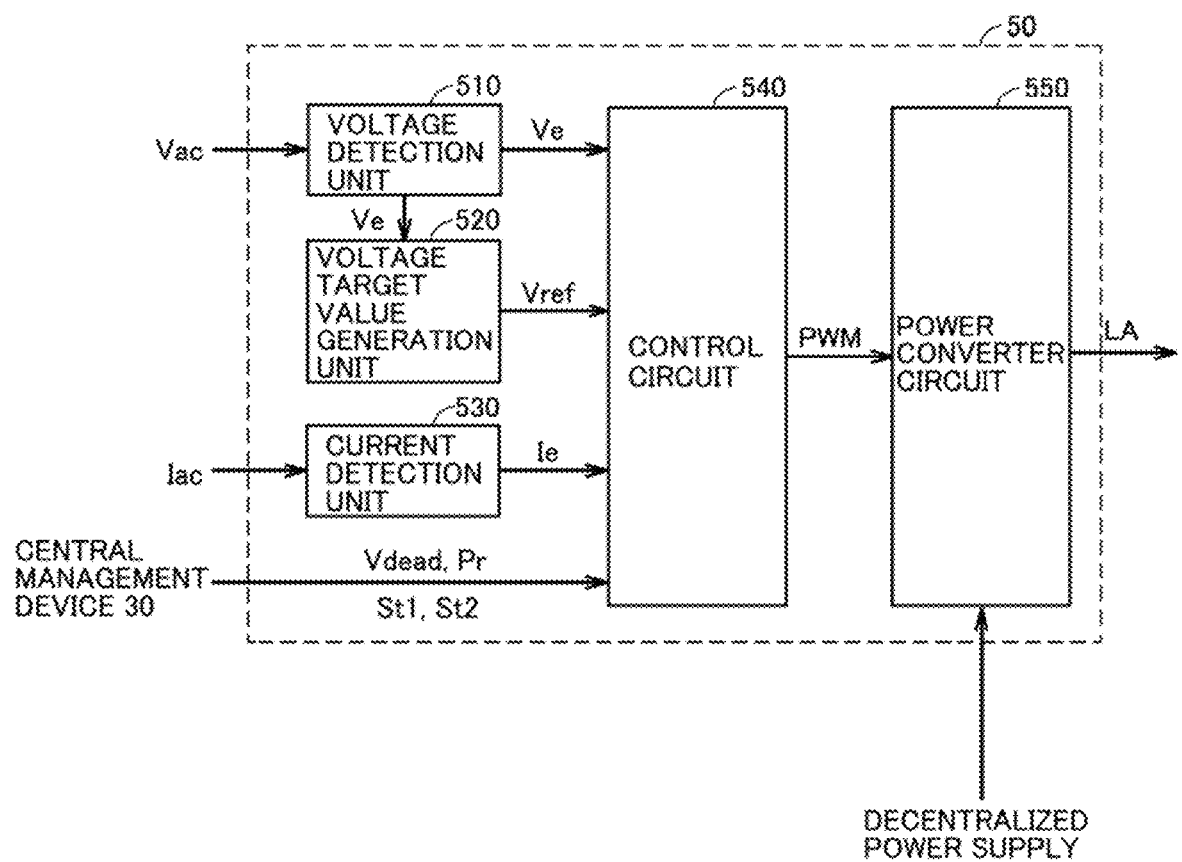
FIG. 3 is a diagram showing a configuration of a power conversion device 50 according to Embodiment 1.

FIG. 3 is a diagram showing a configuration of power conversion device 50 according to Embodiment 1.

Referring to FIG. 3, power conversion device 50 includes a voltage detection unit 510, a voltage target value generation unit 520, a current detection unit 530, a control circuit 540, and a power converter circuit 550.

Voltage detection unit 510 receives AC voltage Vac measured by voltage detector 101, and detects detection voltage root mean square (RMS) Ve from the received AC voltage value Vac.

Voltage target value generation unit 520 calculates an average of detection voltages RMS Ve that are output from voltage detection unit 510 for a period of time (e.g., several minutes or longer), thereby generating a voltage target value Vref, which is a voltage at the point of interconnection having a high-frequency component removed therefrom. Alternatively, voltage target value generation unit 520 may generate voltage target value Vref, which is a voltage at the point of interconnection having a high-frequency component removed therefrom, by removing a high-band component from detection voltage RMS Ve with a low-pass filter.

Current detection unit 530 receives AC current Iac measured by current detector 102, and detects a detection current RMS Ie from the received AC current Iac.

Control circuit 540 receives detection voltage RMS Ve, voltage target value Vref, and detection current RMS Ie, and receives voltage control deadband Vdead, a real-power command value Pr, SVR first settled condition St1, and SVR second settled condition St2 which are transmitted from central management device 30. SVR first settled condition St1 is an SVR voltage step width ΔVsvr. The SVR second settled condition is a tap switching time ΔTtap. Based on these pieces of information received, control circuit 540 calculates control amounts for the voltage and the current at the point of interconnection between power converter circuit 550 and power distribution grid LA, and generates a pulse-width modulation signal PWM in accordance with the calculated control amounts. Pulse-width modulation signal PWM is sent to power converter circuit 550.

Power converter circuit 550 converts a direct-current (DC) power output from a decentralized power supply into an AC power, and outputs the AC power to power distribution grid LA. Power converter circuit 550 is formed of an inverter. Power converter circuit 550 includes a self turn-off semiconductor switching element, a diode element, and a smoothing capacitor. Power converter circuit 550 converts DC power into AC power by changing the DUTY ratio between on/off of a gate signal of the self turn-off semiconductor device. In the present embodiment, the circuit structure of power converter circuit 550 is not limited.

Figure 4:
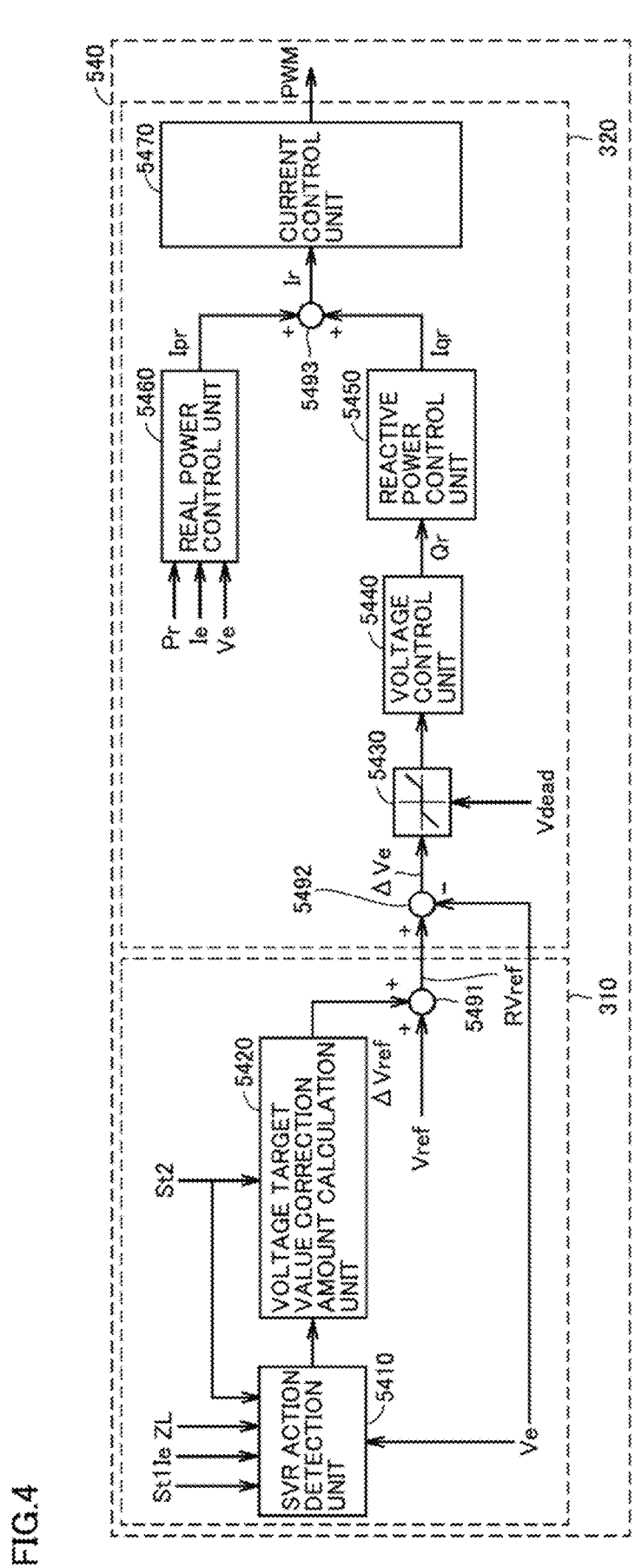
FIG. 4 is a block diagram of a control circuit 540 according to Embodiment 1.

FIG. 4 is a block diagram of control circuit 540 according to Embodiment 1.

Referring to FIG. 4, control circuit 540 includes a correction unit 310 and a command unit 320.

If correction unit 310 detects an action of SVR 20, correction unit 310 corrects voltage target value Vref so that voltage target value Vref corresponds to the detected action.

Correction unit 310 includes an SVR action detection unit 5410, a voltage target value correction amount calculation unit 5420, and an adder 5491.

SVR action detection unit 5410 detects whether the SVR has performed an action, based on SVR first settled condition St1 (ΔVsvr) and SVR second settled condition St2 (ΔTtap), which are transmitted from central management device 30, detection current RMS Ie and detection voltage RMS Ve at the point of interconnection between power conversion device 50 and power distribution grid LA. Specifically, SVR action detection unit 5410 detects that SVR 20 has performed an action, if the absolute value of a rate of change Vrate of detection voltage RMS Ve at the point of interconnection detected by voltage detection unit 510 continues to be above a reference value K1 for a prescribed time period, and the absolute value of a varying amount ΔP of the real power output from power converter circuit 550 is less than a reference value K2. Reference value K1 is determined by SVR first settled condition St1 (ΔVsvr) and SVR second settled condition St2 (ΔTtap). Reference value K2 is determined based on the SVR voltage step width (ΔVsvr [%]) and a power distribution grid voltage low voltage conversion impedance ZL from power converter circuit 550 to SVR 20.

Upon detection of an action of SVR 20, if rate of change Vrate of detection voltage RMS Ve at the point of interconnection is positive, voltage target value correction amount calculation unit 5420 and adder 5491 corrects voltage target value Vref by adding the absolute value of SVR voltage step width ΔVsvr to voltage target value Vref, and, if rate of change Vrate of detection voltage RMS Ve at the point of interconnection is negative, corrects voltage target value Vref by subtracting the absolute value of SVR voltage step width ΔVsvr from voltage target value Vref.

Specifically, if SVR action detection unit 5410 detects an action of the SVR, voltage target value correction amount calculation unit 5420 calculates a voltage target value correction amount ΔVref, based on SVR first settled condition St1. If SVR action detection unit 5410 detects no action of the SVR, voltage target value correction amount calculation unit 5420 sets voltage target value correction amount ΔVref to zero. Adder 5491 adds voltage target value Vref and voltage target value correction amount ΔVref, and outputs a new voltage target value RVref.

If detection voltage RMS Ve at the point of interconnection detected by voltage detection unit 510 deviates from voltage control deadband Vdead referenced to voltage target value RVref, command unit 320 commands power converter circuit 550 to output a reactive power based on the magnitude of the deviated amount of voltage.

Command unit 320 includes a subtractor 5492, an overvoltage output unit 5430, a voltage control unit 5440, a reactive power control unit 5450, a real power control unit 5460, an adder 5493, and a current control unit 5470.

Subtractor 5492 subtracts detection voltage RMS Ve from voltage target value RVref to calculate a deviation ΔVe (=RVref−Ve).

If the absolute value of deviation ΔVe is above voltage control deadband Vdead, overvoltage output unit 5430 outputs |ΔVe|−Vdead. If the absolute value of deviation ΔVe is within or below the voltage control deadband Vdead, overvoltage output unit 5430 outputs 0[V].

Figure 5:
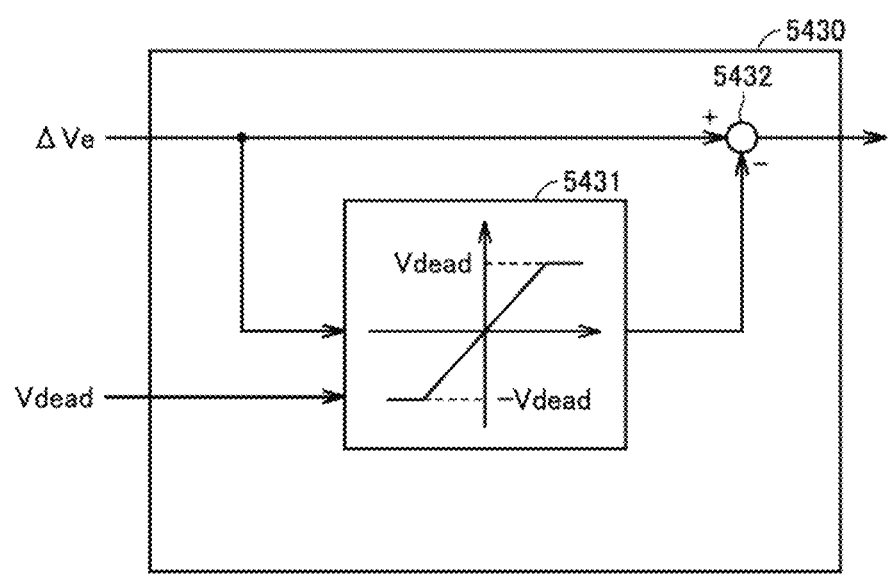
FIG. 5 is a diagram showing a configuration of an overvoltage output unit 5430.

FIG. 5 is a diagram showing a configuration of overvoltage output unit 5430.

Overvoltage output unit 5430 includes a limiter 5431 and a subtractor 5432.

If the absolute value of deviation ΔVe is above voltage control deadband Vdead, limiter 5431 outputs Vdead. If the absolute value of deviation ΔVe is within or below voltage control deadband Vdead, limiter 5431 outputs an absolute value |ΔVe| of deviation ΔVe.

Subtractor 5432 subtracts Vdead or |ΔVe|, which is an output of limiter 5431, from the absolute value |ΔVe| of deviation ΔVe to output |ΔVe|−Vdead or 0[V].

Voltage control unit 5440 proportionally controls the voltage output from overvoltage output unit 5430 to output a control amount, which is obtained by amplifying the output of overvoltage output unit 5430, as a reactive power command value Qr. If the output of overvoltage output unit 5430 is |ΔVe|−Vdead, that is, if the absolute value of deviation ΔVe is above voltage control deadband Vdead, voltage control unit 5440 outputs a control amount, which is obtained by amplifying |ΔVe|−Vdead, to reactive power control unit 5450 as reactive power command value Qr. Voltage control unit 5440 initiates the voltage control if the absolute value of deviation ΔVe increases above voltage control deadband Vdead. As the absolute value of deviation ΔVe decreases to voltage control deadband Vdead or lower, voltage control unit 5440 gradually reduces reactive power command value Qr, and, eventually, stops the voltage control.

Reactive power control unit 5450 outputs a reactive-current command value Iqr so that the reactive power is in accordance with reactive power command value Qr.

Real power control unit 5460 outputs a real-current command value Ipr so that an electric power obtained by calculating detection current RMS Ie and detection voltage RMS Ve is in accordance with real-power command value Pr.

Real-power command value Pr is a command value for an amount of electric power when supplied, for example, from either one or both the solar power generator or the storage battery to the grid, regarding the decentralized power supply system as a virtual power plant.

Adder 5493 adds real-current command value Ipr output from real power control unit 5460 and reactive-current command value Iqr output from reactive power control unit 5450 to generate a current command value Ir.

Current control unit 5470 outputs pulse-width modulation signal PWM so that AC current Iac is in accordance with the current command value Ir, thereby driving the gate of power converter circuit 550.

Figure 6:
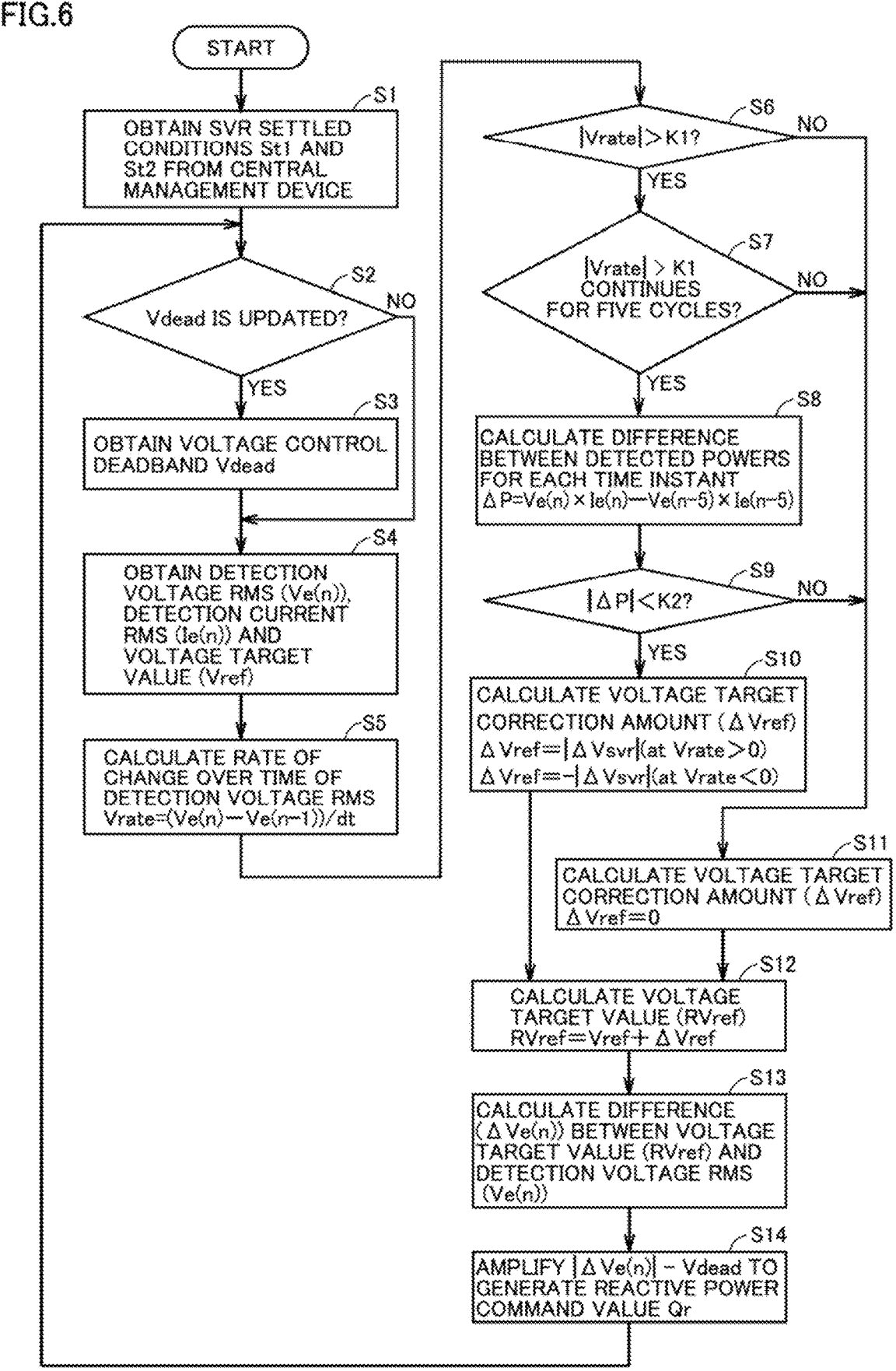
FIG. 6 is a flowchart illustrating a procedure for generating a reactive power command value Qr for a control circuit 540 according to Embodiment 1.

FIG. 6 is a flowchart illustrating a procedure for generating reactive power command value Qr for control circuit 540 according to Embodiment 1.

In step S1, control circuit 540 obtains SVR first settled condition St1 and SVR second settled condition St2 from central management device 30, and holds them in a memory. SVR first settled condition St1 is the SVR voltage step width ($\Delta$Vsvr [%]). SVR second settled condition St2 is the tap switching time ($\Delta$Ttap). Central management device 30 obtains, from a power company, information on the SVR settling conditions and the line impedance of a power distribution grid managed by central management device 30, and holds the information.

In step S2, if voltage control deadband Vdead is updated, the process proceeds to step S3. If no update is made to voltage control deadband Vdead, the process returns to step S2. Central management device 30 periodically delivers voltage control deadband Vdead for each power conversion device to power conversion device 50.

In step S3, control circuit 540 obtains voltage control deadband Vdead. This allows the reactive power output by the respective decentralized power supply systems to be made more uniform.

In step S4, control circuit 540 obtains detection voltage RMS Ve(n) and detection current RMS Ie(n) at the point of interconnection between power conversion device 50 and power distribution grid LA at time T(n), and voltage target value Vref, and holds the obtained values in a memory.

In step S5, SVR action detection unit 5410 divides a difference between detection voltage RMS Ve(n) at time T(n) and the previously-obtained detection voltage RMS Ve(n−1) at time T(n−1) by a time difference $\Delta$t ($\Delta$t=T(n)−T(n−1)), thereby calculating rate of change Vrate of detection voltage RMS Ve. Time difference $\Delta$t corresponds to one cycle. Once cycle is tap switching time $\Delta$Ttap divided by a cycle of a grid frequency. For example, if the grid frequency is 50 Hz and SVR tap switching time $\Delta$Ttap is 0.1 seconds, one cycle is 0.1 seconds divided by a cycle of the grid frequency, 0.02 seconds.

$$V\text{rate}=(Ve(n)-Ve(n-1))/(T(n)-T(n-1)) \quad (1)$$

In step S6, based on the SVR voltage step width ($\Delta$Vsvr [%]) and the SVR tap switching time ($\Delta$Ttap), SVR action detection unit 5410 determines reference value K1 for 90% of the voltage deviation for a low voltage 200V of the power distribution grid.

$$K1=|\Delta V\text{svr}|*200*0.9/\Delta T\text{tap} \quad (2)$$

SVR action detection unit 5410 compares the absolute value of rate of change Vrate of detection voltage RMS Ve with the magnitude of reference value K1. If the absolute value of rate of change Vrate of detection voltage RMS Ve is greater than reference value K1, the process proceeds to step S7. If the absolute value of rate of change Vrate of detection voltage RMS Ve is less than or equal to reference value K1, the process proceeds to step S11.

In step S7, SVR action detection unit 5410 determines whether the absolute value of the rate of change Vrate of detection voltage RMS Ve continues to be greater than reference value K1 for five cycles. If SVR action detection unit 5410 does not determine that the absolute value of the rate of change Vrate of detection voltage RMS Ve continues to be greater than reference value K1 for five cycles, the process proceeds to step S11. If SVR action detection unit 5410 determines that the absolute value of the rate of change Vrate of detection voltage RMS Ve continues to be greater than reference value K1 for five cycles, the process proceeds to step S8.

In step S8, SVR action detection unit 5410 calculates a difference $\Delta$P between the detected power at time T(n) and the detected power at time T(n−5), in accordance with the following equation. Where T(n) is the current time, time T(n−5) is a time five cycles prior to the current time.

$$\Delta P=Ve(n)\times Ie(n)-Ve(n-5)\times Ie(n-5) \quad (3)$$

In step S9, SVR action detection unit 5410 determines reference value K2. Reference value K2 indicates an amount of electric power required for the voltage at the point of interconnection between decentralized power supply system 90 and power distribution grid LA to fluctuate, upon the action of the SVR, to an extent corresponding to the voltage step width. Based on the SVR voltage step width ($\Delta$Vsvr [%]) for a low voltage 200V of the power distribution grid, the low voltage (200V) of the power distribution grid, and power distribution grid voltage low-voltage conversion impedance ZL from decentralized power supply system 90 to SVR 20, control circuit 540 calculates reference value K2, in accordance with Equation:

$$K2=(\Delta V\text{svr}\times 200)\times 200/ZL \quad (4)$$

If the absolute value of the difference $\Delta$P between the detected powers is less than reference value K2 (S9: YES), the process proceeds to step S10. If the absolute value of the difference $\Delta$P between the detected powers is greater than or equal to reference value K2 (S9: NO), the process proceeds to step S11. When step S9 is NO, the difference $\Delta$P is regarded as step fluctuations of the voltage that is associated with fluctuations in electric power of the power distribution grid. If YES in step S9, the difference $\Delta$P is regarded as step fluctuations of the voltage that is caused by SVR 20 switching the taps.

In step S10, if rate of change Vrate of detection voltage RMS Ve is positive, voltage target value correction amount calculation unit 5420 calculates voltage target correction amount $\Delta$Vref in accordance with Equation (5) below. If rate of change Vrate of detection voltage RMS Ve is negative, control circuit 540 calculates voltage target correction amount $\Delta$Vref in accordance with Equation (6) below:

$$\Delta V\text{ref}=|\Delta V\text{svr}| \quad (5)$$

$$\Delta V\text{ref}=-|\Delta V\text{svr}| \quad (6)$$

In step S11, voltage target value correction amount calculation unit 5420 sets voltage target correction amount $\Delta$Vref to zero.

In step S12, using voltage target correction amount $\Delta$Vref determined in steps S10 and S11, adder 5491 adds voltage target value Vref and voltage target correction amount $\Delta$Vref to calculate a new voltage target value RVref.

In step S13, subtractor 5492 calculates difference $\Delta$Ve(n) between voltage target value RVref and detection voltage RMS Ve(n).

In step S14, overvoltage output unit 5430 outputs |$\Delta$Ve|−Vdead if the absolute value of deviation $\Delta$Ve is above voltage control deadband Vdead, and outputs 0[V] if the absolute value of deviation $\Delta$Ve is within or below voltage control deadband Vdead. If the output of overvoltage output unit 5430 is |$\Delta$Ve|−Vdead, that is, if the absolute value of deviation ΔVe is above voltage control deadband Vdead, voltage control unit 5440 outputs a control amount, which is obtained by amplifying |ΔVe|−Vdead, to reactive power control unit 5450, as reactive power command value Qr.

Next, effects of correction of voltage target value Vref which is made upon the action of SVR 20 will be described.

Figure 7:
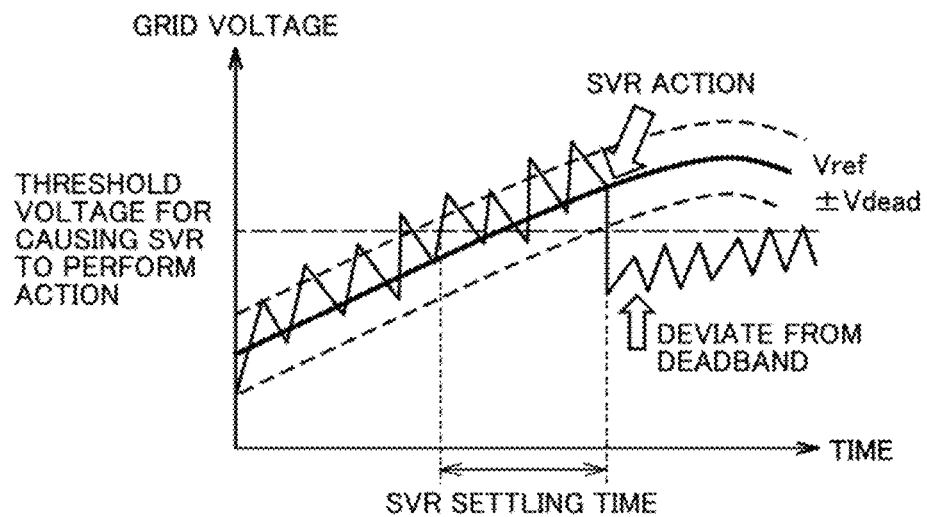
FIG. 7 shows (a) a diagram illustrating changes in voltage over time of a power distribution grid if no correction is made to a voltage target value Vref when an SVR 20 has performed an action, and (b) a diagram illustrating changes in voltage over time of the power distribution grid if voltage target value Vref is corrected when SVR 20 has performed an action.
Figure 7:
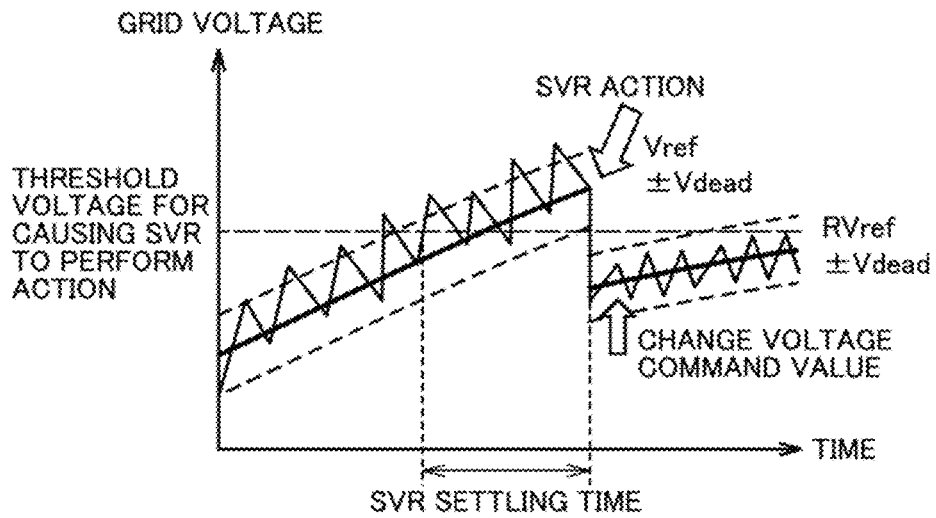

Part (a) of FIG. 7 is a diagram illustrating changes in voltage over time of the power distribution grid when no correction is made to voltage target value Vref upon action of SVR 20.

If the voltage of the power distribution grid deviates from the voltage control deadband, that is, if the voltage of the power distribution grid is beyond Vref+Vdead or below Vref−Vdead, power conversion device 50 controls the voltage of the power distribution grid by outputting a reactive power.

Here, if the voltage of the power distribution grid increases greater than or equal to a threshold voltage for causing SVR 20 to perform an action and SVR 20 performs an action, and the SVR settling time is exceeded, SVR 20 switches the taps to reduce the voltage of the power distribution grid. This reduces the voltage of the power distribution grid by generally 1% to 2%. An action performed by SVR 20 also reduces the voltage of the power distribution grid less than (Vref−Vdead). As a result, a large amount of reactive power is to be output.

Part (b) of FIG. 7 is a diagram illustrating changes in voltage over time of the power distribution grid if voltage target value Vref is corrected upon action of SVR 20.

The correction of voltage target value Vref to RVref after the detection of an action of SVR 20 changes the voltage of the power distribution grid along voltage target value RVref. Thus, the voltage of the power distribution grid transitions between (RVref−Vdead) and (RVref+Vdead). As a result, no reactive power is output.

In the above example, an action of the SVR is detected based on the rate of change of the voltage at the point of interconnection between power conversion device 50 and power distribution grid LA, and the amount of fluctuation of the electric power. No fluctuation of the electric power is present when the SVR performs an action. Thus, the SVR can be determined to as having performed an action if the rate of change of the current RMS at the point of interconnection exceeds the reference value and no fluctuation of the electric power is present. However, the voltage target value corrects the polarity of the change of the current RMS at the point of interconnection to the opposite polarity.

Alternatively, central management device 30 may observe the voltage of the SVR at an observation point, and if a time, at which the voltage at the observation point increases above the voltage control deadband for the SVR, exceeds the SVR settling time, central management device 30 may detects an action of the SVR, and transmits "the current voltage control deadband+the SVR voltage step width" to power conversion device 50, as a voltage control deadband. This can prevent unwanted output of the reactive power upon the action of the SVR. In this case, while the voltage control deadband temporality expands upon the detection of an action of the SVR, which turns off the voltage control, power conversion device 50 autonomously restores the voltage control deadband before an action of the SVR, at a moment the difference between the voltage target value and the measurement value of the voltage at the point of interconnection decreases below the voltage control deadband before an action of the SVR. This restores the original voltage control, thereby stabilizing the voltage of the power distribution grid.

As described above, according to the present embodiment, in the power conversion system which includes the SVR and the decentralized power supply system, the central management device and a power conversion device included in the decentralized power supply system coordinate with each other to stabilize the voltage of the power distribution grid by outputting a reactive power. This prevents unwanted reactive power to be outputted when the SVR has performed an action, thereby preventing fluctuations of the voltage of the power distribution grid.

Setting voltage control deadband Vdead for power conversion device smaller than voltage control deadband Vdead (SVR) for SVR allows the voltage at the point of interconnection between the decentralized power supply and power distribution grid LA to deviate, upon the fluctuation of the voltage of the power distribution grid, from the voltage control deadband earlier than SVR observation point. This allows power conversion device 50 included in the decentralized power supply system to instantly output a reactive power, thereby suppressing the voltage fluctuations in a short cycle and reducing the number of actions of the SVR.

Embodiment 2

Embodiment 2 is now described with reference to a method of stabilization control over the voltage of a power distribution grid included in a power conversion system in which a decentralized power supply system is interconnected with a high-voltage grid. A power conversion system according to Embodiment 2 does not include central management device 30 according to Embodiment 1.

Figure 8:
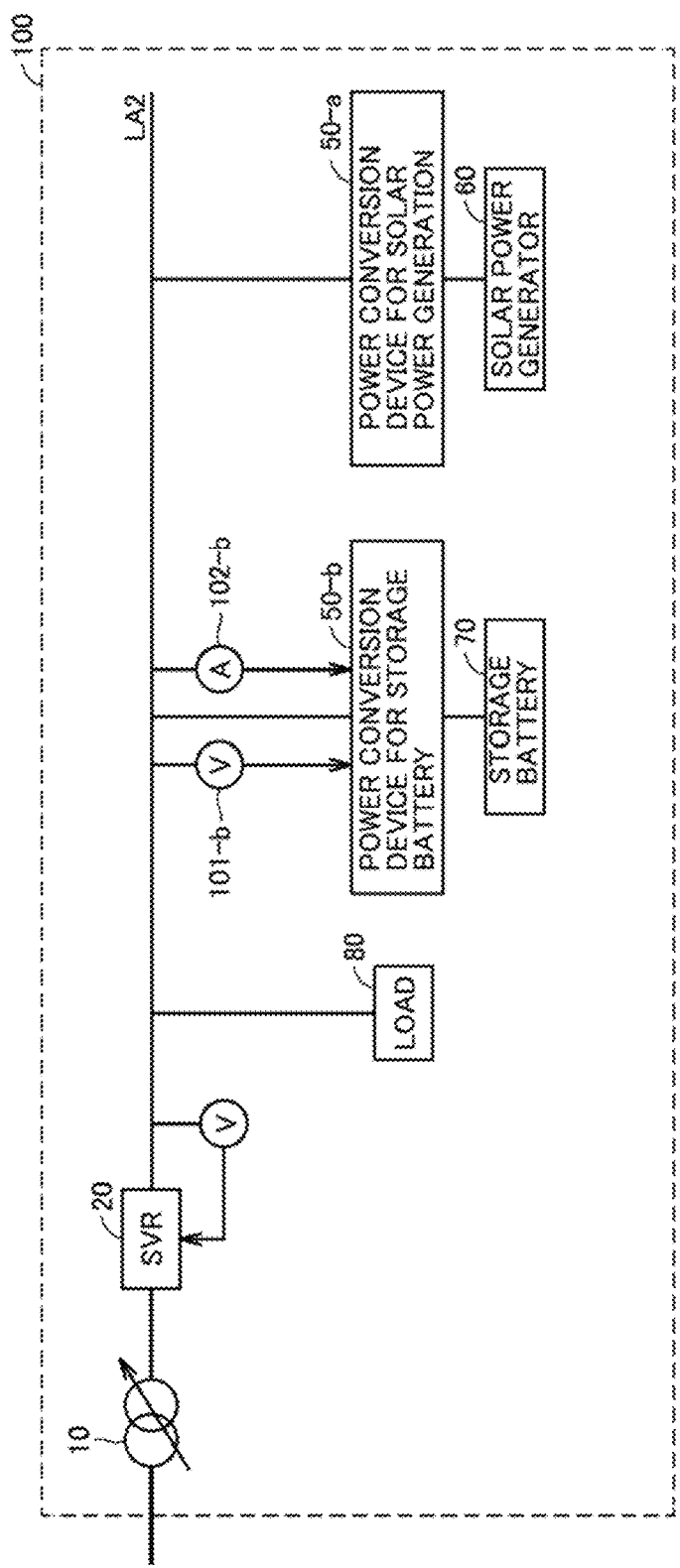
FIG. 8 is a schematic view of a power conversion system 100 according to Embodiment 2.

FIG. 8 is a schematic view of a power conversion system 100 according to Embodiment 2. Referring to FIG. 8, in power conversion system 100, a step voltage regulator SVR 20, a load 80, and a power conversion device 50 are interconnected with a high-voltage power distribution grid LA2 via a substation 10.

While FIG. 8 illustrates one storage battery 70 and one solar power generator 60, multiple storage batteries 70 and multiples solar power generator 60 may be disposed in a distributed manner.

Figure 9:
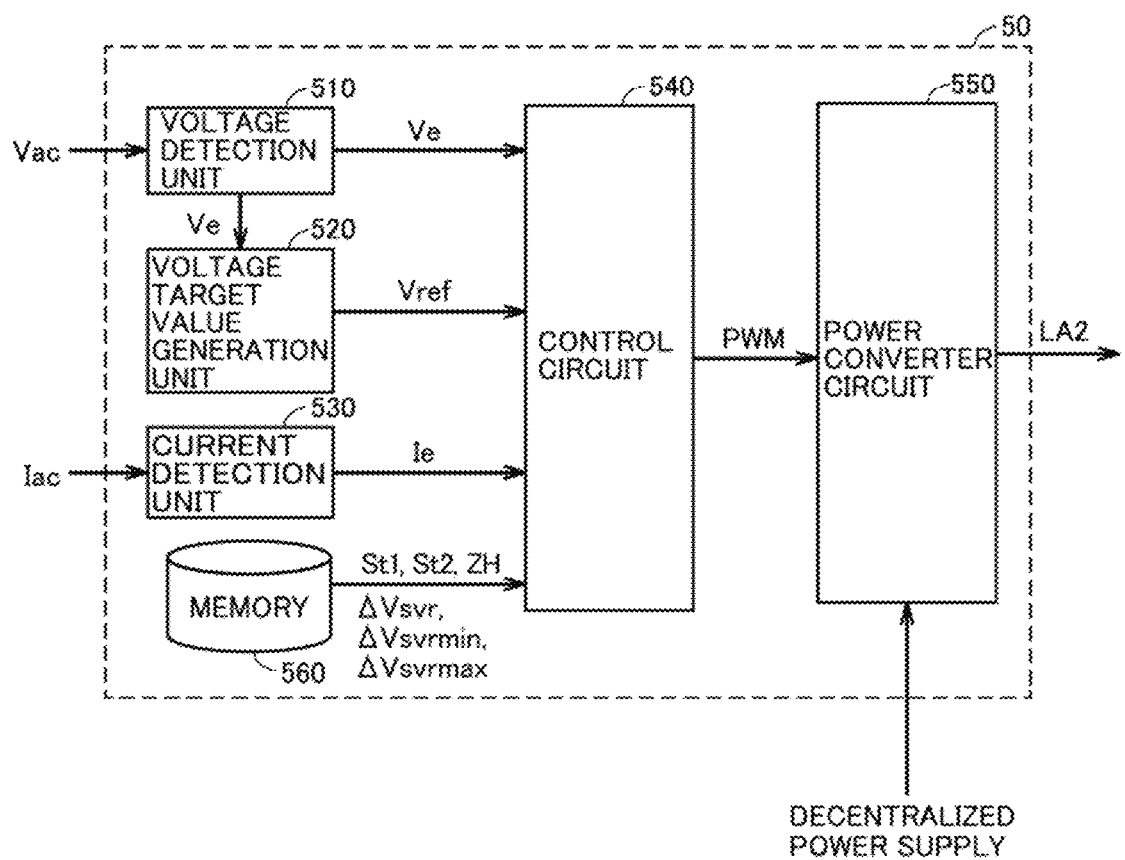
FIG. 9 is a diagram showing a configuration of a power conversion device 50 according to Embodiment 2.

FIG. 9 is a diagram showing a configuration of power conversion device 50 according to Embodiment 2.

Referring to FIG. 9, in Embodiment 2, since central management device 30 is not installed, power conversion device 50 cannot receive SVR settled conditions St1 and St2, and a voltage control deadband Vdead, which are transmitted from central management device 30 according to Embodiment 1.

Power conversion device 50 holds in a memory 560 a line impedance ZH of power distribution grid LA2, presented by a power company. Power conversion device 50 holds SVR first settled condition St1 in memory 560. SVR first settled condition St1 includes a lower limit ΔVsvrMin and an upper limit ΔVsvrMax for a general SVR voltage step width, and a temporary value ΔVsvr of the SVR voltage step width. For example, ΔVsvrMin=1%, and ΔVsvrMax=2%. ΔVsvr is greater than or equal to ΔVsvrMin and less than or equal to ΔVsvrMax. Power conversion device 50 holds SVR second settled condition St2 (ΔTtap) in memory 560.

The other configuration illustrated in FIG. 9 is the same as one illustrated in FIG. 3, and already described in Embodiment 1. Thus, the description will not be repeated. The block diagram of a control circuit 540 is the same as one shown in FIG. 4 and already described in Embodiment 1. Thus, the description will not be repeated.

Figure 10:
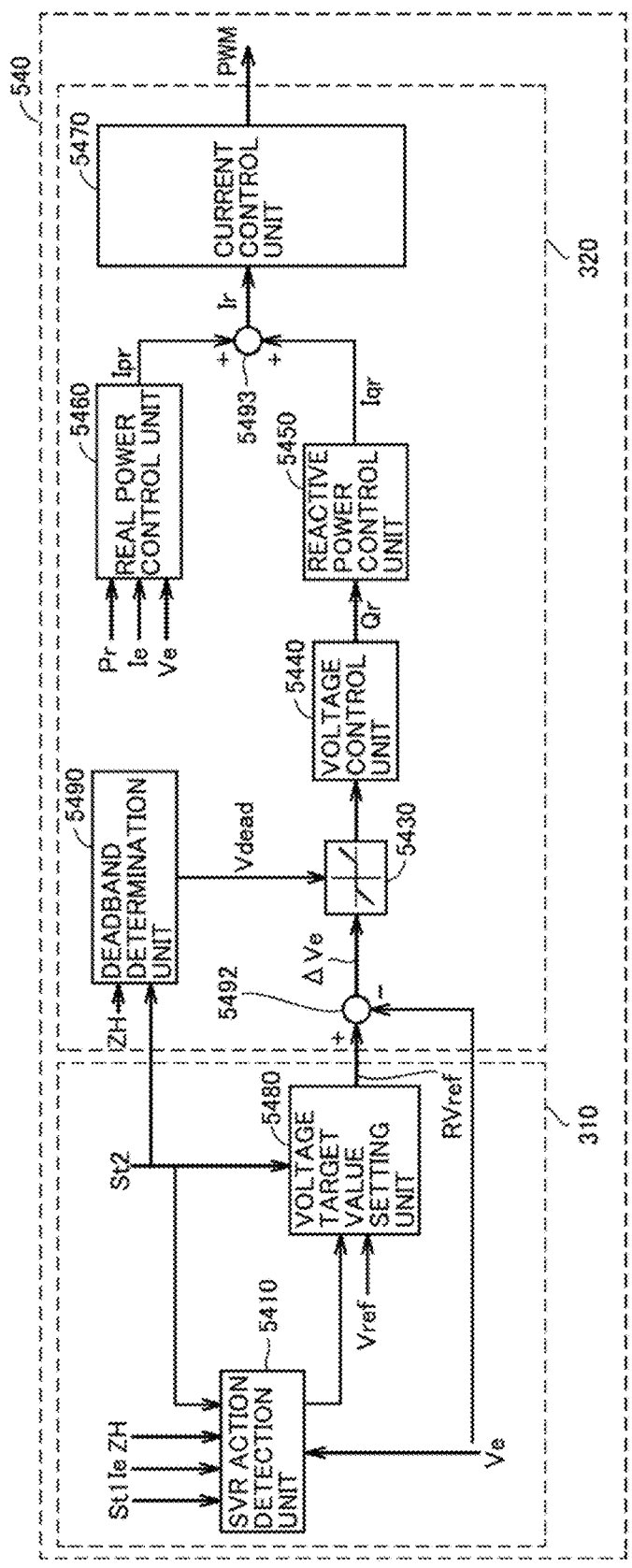
FIG. 10 is a block diagram of a control circuit 540 according to Embodiment 2.

FIG. 10 is a block diagram of control circuit 540 according to Embodiment 2.

Referring to FIG. 10, control circuit 540 includes a correction unit 310 and a command unit 320.

As with Embodiment 1, when an action of SVR 20 is detected, correction unit 310 corrects voltage target value Vref so that voltage target value Vref corresponds to the detected action.

Correction unit 310 includes an SVR action detection unit 5410 and a voltage target value determination unit 5480.

SVR action detection unit 5410 detects whether the SVR has performed an action, based on SVR first settled condition St1 (ΔVsvrMin, ΔVsvrMax, ΔVsvr) and SVR second settled condition St2 (ΔTtap) held in memory 560, and detection current RMS Ie and detection voltage RMS Ve at the point of interconnection between power conversion device 50 and power distribution grid LA2. Specifically, SVR action detection unit 5410 detects that SVR 20 has performed an action, if the absolute value of a rate of change Vrate of detection voltage RMS Ve at the point of interconnection detected by voltage detection unit 510 continues to be above a reference value K3 and less than a reference value K4 for a prescribed time period, and the absolute value of a varying amount ΔP of the real power output from power converter circuit 550 is less than a reference value K5. Reference value K3 is determined based on a lower limit (ΔVsvrMin[%]) of the SVR voltage step width and an SVR tap switching time (ΔTtap). Reference value K4 is determined based on an upper limit (ΔVsvrMax [%]) of the SVR voltage step width and SVR tap switching time (ΔTtap). Reference value K5 is determined based on the SVR voltage step width (ΔVsvr [%]), and a power distribution grid voltage high voltage conversion impedance ZH from power converter circuit 550 to SVR 20.

Based on voltage target value Vref output from voltage target value generation unit 520, temporary value ΔVsvr of the SVR voltage step width held in memory 560, and a result of output of SVR action detection unit 5410, voltage target value determination unit 5480 outputs a new voltage target value RVref.

Voltage target value determination unit 5480 calculates a voltage target value lower limit VrefMin and a voltage target value upper limit VrefMax, based on voltage target value Vref and temporary value ΔVsvr of the SVR voltage step width. When an action of SVR 20 is detected, if rate of change Vrate of detection voltage RMS Ve at the point of interconnection is negative, voltage target value determination unit 5480 sets voltage target value RVref to voltage target value lower limit VrefMin, and, if the rate of change Vrate is positive, sets voltage target value RVref to voltage target value upper limit VrefMax.

As with Embodiment 1, if detection voltage RMS Ve at the point of interconnection detected by voltage detection unit 510 deviates from voltage control deadband Vdead referenced to voltage target value Vref, command unit 320 commands power converter circuit 550 to output a reactive power based on the magnitude of the deviated amount of voltage.

Command unit 320 includes a subtractor 5492, an overvoltage output unit 5430, a voltage control unit 5440, a reactive power control unit 5450, a real power control unit 5460, an adder 5493, a current control unit 5470, and a deadband determination unit 5490.

Overvoltage output unit 5430, voltage control unit 5440, reactive power control unit 5450, real power control unit 5460, current control unit 5470, subtractor 5492, and adder 5493 are the same as those according to Embodiment 1. Thus, the description thereof will not be repeated.

Based on line impedance ZH of power distribution grid LA2 and detection voltage RMS Ve at the point of interconnection, deadband determination unit 5490 determines voltage control deadband Vdead so that the voltage at the point of interconnection is not above the upper limit of power distribution grid LA2 and not below the lower limit of power distribution grid LA2. The shorter the distance from SVR 20, the smaller the deadband determination unit 5490 sets voltage control deadband Vdead.

Figure 11:
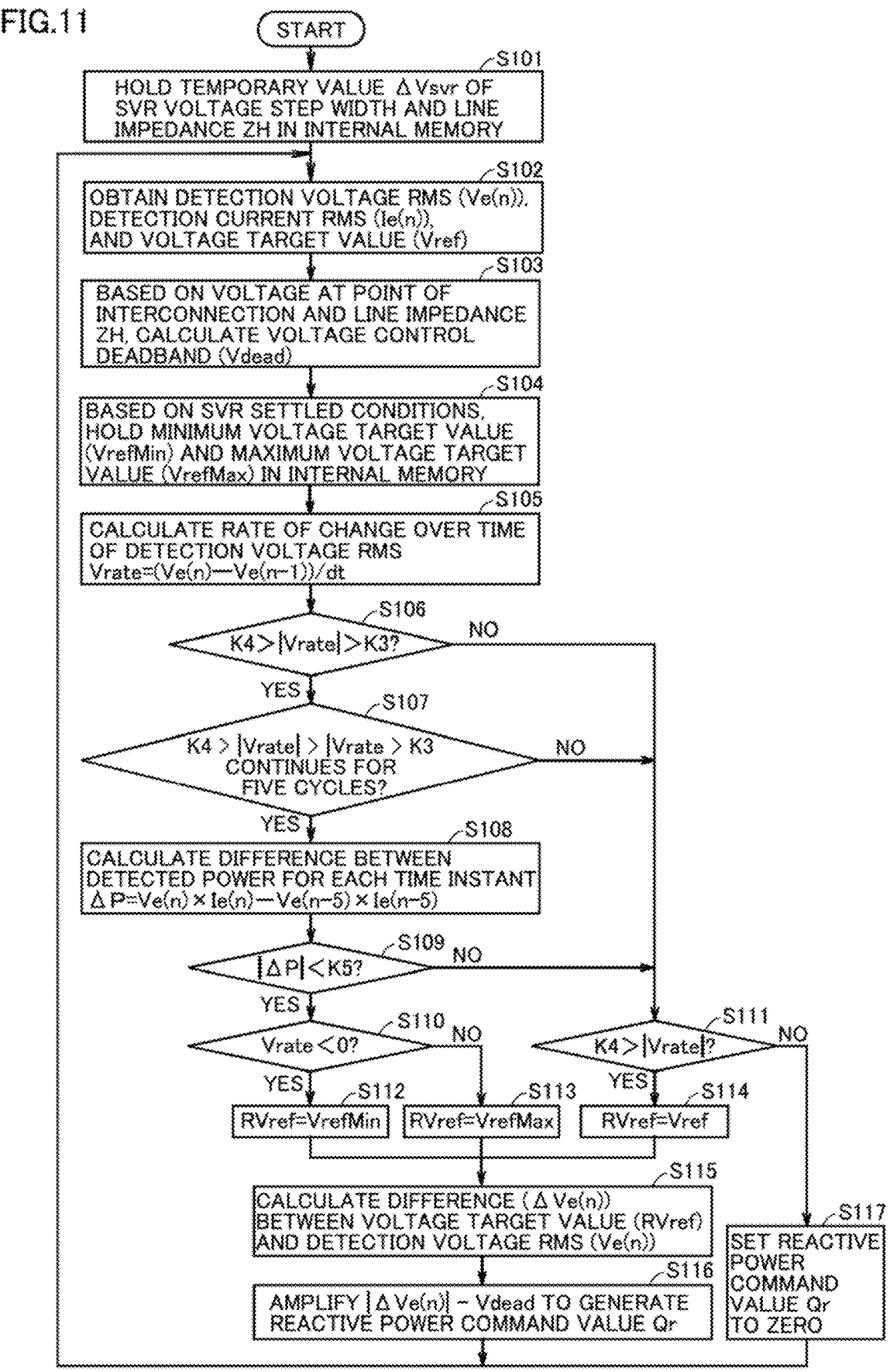
FIG. 11 is a flowchart illustrating a procedure for generating a reactive power command value Qr for control circuit 540 according to Embodiment 2.

FIG. 11 is a flowchart illustrating a procedure for generating a reactive power command value Qr for control circuit 540 according to Embodiment 2.

In step S101, power conversion device 50 holds, in the internal memory 560, temporary value ΔVsvr of the SVR voltage step width and line impedance ZH from substation 10 to power conversion device 50.

In step S102, power conversion device 50 obtains detection voltage RMS Ve(n) and detection current RMS Ie(n) at the point of interconnection between power conversion device 50 and power distribution grid LA2 at time T(n), and voltage target value Vref, and holds them in the internal memory 560.

In step S103, based on the voltage at the point of interconnection at which power conversion device 50 is connected to power distribution grid LA2, and line impedance ZH, deadband determination unit 5490 determines voltage control deadband Vdead, as follows, so that the voltage at the point of interconnection remains within the upper limit and the lower limit of the voltage of the power distribution grid.

If voltage control deadband Vdead for power conversion device 50 is set smaller than voltage control deadband Vdead (SVR) for SVR 20, power conversion device 50 is allowed to initiate voltage control before SVR 20, thereby allowing power conversion device 50 to suppress voltage fluctuations in a short cycle.

In general, voltage control deadband Vdead (SVR) for SVR is 1% to 2% of a reference voltage VR. Thus, desirably, voltage control deadband Vdead for the power conversion device is set to 0.9% or less than Vdead (SVR). Voltage control deadband Vdead may be a fixed value. Voltage control deadband Vdead of power conversion device 50 may be dynamically reduced to 50% of the current value if the voltage of the power distribution grid is in the vicinity of the upper limit or in the vicinity of the lower limit. Owing to this, as the voltage of the power distribution grid approaches the upper limit or the lower limit, a large amount of reactive power is output in response to the voltage fluctuations in a short cycle, thereby yielding advantageous effects of extending the SVR action time intervals. The greater the line impedance ZH from SVR 20, the greater the rate of voltage rise at the point of interconnection between power conversion device 50 and power distribution grid LA2 caused by the reverse power flow. Thus, desirably, a greater voltage control deadband Vdead is set to power conversion device 50 that has a longer distance to SVR 20.

Accordingly, deadband determination unit 5490 sets voltage control deadband Vdead(R) for power conversion device 50 farthest away from SVR 20 to 90% of voltage control deadband Vdead (SVR) for SVR 20. Deadband determination unit 5490 sets a smaller voltage control deadband Vdead for power conversion device 50 that has a shorter distance to SVR 20. Deadband determination unit 5490 sets voltage control deadband Vdead(N) for the power conversion device closest to SVR 20 to 50% of voltage control deadband Vdead(R) for power conversion device 50 that is farthest away from SVR 20.

In step S104, based on voltage target value Vref and temporary value ΔVsvr of the SVR voltage step width, voltage target value determination unit 5480 calculates voltage target value lower limit VrefMin and voltage target value upper limit VrefMax, and holds them in the internal memory 560.

$$VrefMin = Vref - |\Delta Vsvr| * 6600 \quad (7)$$

$$VrefMax = Vref + |\Delta Vsvr| * 6600 \quad (8)$$

where 6600 represents a high voltage of the power distribution grid.

In step S105, SVR action detection unit 5410 divides a difference between detection voltage RMS Ve(n) at time T(n) and the previously-obtained detection voltage RMS Ve(n−1) at time T(n−1) by a time difference Δt (Δt=T(n)−T(n−1)), thereby calculating rate of change Vrate of detection voltage RMS Ve, as indicated by Equation:

$$Vrate = Ve(n) - Ve(n-1)/(T(n) - T(n-1)) \quad (9)$$

In step S106, based on the lower limit (ΔVsvrMin[%]) of the SVR voltage step width and SVR tap switching time (ΔTtap), SVR action detection unit 5410 determines reference value K3 for the voltage deviation for a high voltage 6600V of the power distribution grid, as indicated by Equation below. Based on the upper limit (ΔVsvrMax [%]) of the SVR voltage step width and SVR tap switching time (ΔTtap), SVR action detection unit 5410 determines reference value K4 for the voltage deviation for a high voltage 6600V of the power distribution grid, as indicated by Equation:

$$K3 = |\Delta VsvrMin| * 6600 / \Delta Ttap \quad (10)$$

$$K4 = |\Delta VsvrMax| * 6600 / \Delta Ttap \quad (11)$$

SVR action detection unit 5410 compares the absolute value of rate of change Vrate of detection voltage RMS Ve with the magnitudes of the reference values K3 and K4. If K4>|Vrate|>K3, the process proceeds to step S7. If K4>|Vrate|>K3 is not satisfied, the process proceeds to step S11.

In step S107, SVR action detection unit 5410 determines whether the condition satisfying K4>|Vrate|>|Vrate>K3 continues for five cycles, where one cycle is the tap switching time divided by a cycle of the grid frequency. For example, if the grid frequency is 50 Hz and SVR tap switching time ΔTtap is 0.1 seconds, one cycle is 0.1 divided by a cycle of the grid frequency, 0.02 seconds. If SVR action detection unit 5410 does not determine that the condition continues for five cycles, the process proceeds to step S111. If SVR action detection unit 5410 determines that the condition continues for five cycles, the process proceeds to step S108.

In step S108, SVR action detection unit 5410 calculates a difference ΔP between the detected power at time T(n) and the detected power at time T(n−5), in accordance with the following equation. Where T(n) is the current time, time T(n−5) is a time five cycles prior to the current time.

$$\Delta P = Ve(n) \times Ie(n) - Ve(n-5) \times Ie(n-5) \quad (12)$$

In step S109, SVR action detection unit 5410 determines reference value K5. Reference value K5 indicates an amount of electric power required for the voltage at the point of interconnection to fluctuate, upon the action of the SVR, to an extent corresponding to the voltage step width. Based on the SVR voltage step width (ΔVsvr [%]) for a high voltage 6600V of the power distribution grid, a high voltage (6600V) of the power distribution grid, and a power distribution grid voltage high-voltage conversion impedance ZH from power converter circuit 550 to SVR 20, control circuit 540 calculates reference value K5, in accordance with Equation:

$$K5 = (\Delta Vsvr \times 6600) \times 6600 / ZH \quad (13)$$

If the absolute value of the difference ΔP between the detected powers is less than reference value K5 (S109: YES), the process proceeds to step S110. If the absolute value of the difference ΔP between the detected powers is greater than or equal to reference value K5 (S109: NO), the process proceeds to step S111. If NO in step S109, the difference ΔP is regarded as step fluctuation of voltage associated with the power fluctuation of the power distribution grid. If Yes in step S109, the difference ΔP is regarded as step fluctuations of the voltage that is caused by SVR 20 switching the taps.

In step S110, if rate of change Vrate of detection voltage RMS Ve is negative, the process proceeds to step S112. If rate of change Vrate of detection voltage RMS Ve is zero or positive, the process proceeds to step S113.

In step S112, voltage target value determination unit 5480 sets a new voltage target value RVref to voltage target value lower limit VrefMin.

In step S113, voltage target value determination unit 5480 sets a new voltage target value RVref to voltage target value upper limit VrefMax.

In step S111, voltage target value determination unit 5480 compares the absolute value of rate of change Vrate of detection voltage RMS Ve with the magnitude of reference value K4. If K4>|Vrate|, the process proceeds to step S114. If K4≤|Vrate|, the process proceeds to step S117.

In step S114, voltage target value determination unit 5480 maintains voltage target value Vref. In other words, RVref=Vref is set.

In step S115, subtractor 5492 calculates a difference ΔVe(n) between voltage target value RVref and detection voltage RMS Ve(n).

In step S116, overvoltage output unit 5430 outputs |ΔVe|−Vdead if the absolute value of deviation ΔVe is above voltage control deadband Vdead, and outputs 0[V] if the absolute value of deviation ΔVe is within or below voltage control deadband Vdead. If the output of overvoltage output unit 5430 is |ΔVe|−Vdead, that is, if the absolute value of deviation ΔVe is above voltage control deadband Vdead, voltage control unit 5440 outputs a control amount, which is obtained by amplifying |ΔVe|−Vdead, to reactive power control unit 5450, as reactive power command value Qr.

In step S117, since voltage fluctuations and power fluctuations that are greater than an action of the SVR are present, the possibility of a grid fault cannot be ruled out. Therefore, it may be preferable to not output a reactive power. Thus, voltage control unit 5440 sets reactive power command value Qr to zero.

As described above, according to the present embodiment, voltage target value upper limit VrefMax and voltage target value lower limit VrefMin after the SVR has performed an action are held, and, if an action of the SVR is autonomously detected, the voltage target value after an action of the SVR is promptly corrected, based on voltage target value Vref and temporary value ΔVsvr of the SVR voltage step width. This can suppress output of reactive power.

Figure 12:
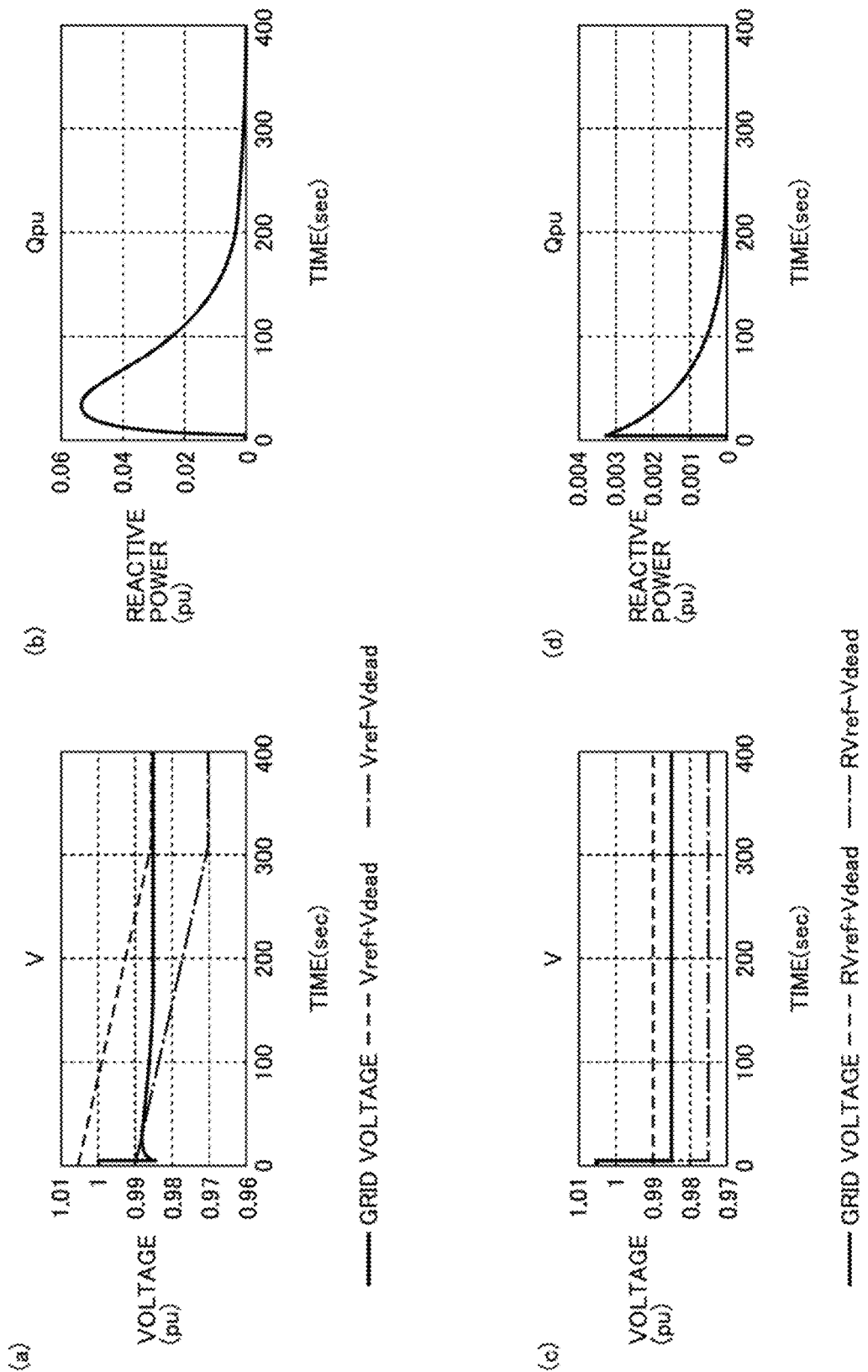
FIG. 12 shows (a) a diagram illustrating one example result of simulation of a voltage of a power distribution grid if no correction is made to a voltage target value Vref when an SVR 20 has performed an action, (b) a diagram illustrating one example result of simulation of a reactive power that is output if no correction is made to voltage target value Vref when SVR 20 has performed an action, (c) a diagram illustrating one example result of simulation of a voltage of the power distribution grid if voltage target value Vref is corrected when SVR 20 has performed an action, and (d) a diagram illustrating one example result of simulation of a reactive power that is output if voltage target value Vref is corrected when SVR 20 has performed an action.

Part of (a) FIG. 12 is a diagram illustrating one example result of simulation of a voltage of the power distribution grid when no correction is made to voltage target value Vref upon action of SVR 20. Part (b) of FIG. 12 is a diagram illustrating one example result of simulation of a reactive power that is output when no correction is made to voltage target value Vref upon action of SVR 20.

As illustrated in (a) of FIG. 12, one can notice that the voltage of the power distribution grid is below Vref−Vdead immediately after an action of SVR 20. As illustrated in (b) of FIG. 12, one can notice that a large amount of reactive power is output immediately after an action of SVR 20.

Part (c) of FIG. 12 is a diagram illustrating one example result of simulation of a voltage of the power distribution grid if voltage target value Vref is corrected upon action of SVR 20. Part (d) of FIG. 12 is a diagram illustrating one example result of simulation of a reactive power that is output if voltage target value Vref is corrected upon actuation of SVR 20.

As illustrated in (c) of FIG. 12, one can notice that immediately after an action of SVR 20, a voltage of the power distribution grid falls within a range between RVref−Vdead and RVref+Vdead. As illustrated in (d) of FIG. 12, the reactive power immediately after an action of SVR 20 is 1/14 the reactive power that is output when no correction is made to voltage target value Vref.

As described above, according to the present embodiment, the power conversion device, which does not receive any information from a central management device, autonomously determines the voltage control deadband, thereby correcting the voltage target value for controlling the reactive power. This allows the voltage of the power distribution grid to be stabilized, without requiring to output a reactive power. The power conversion device also autonomously determines an action performed by the step voltage regulator, using the upper and lower limits for a generally-presumed rate of change of a step voltage. For voltage fluctuations which may be caused by a grid fault, the reactive power command value is set to zero to stop output of a reactive power output. This can suppress fluctuations of the voltage of the power distribution grid that is caused by unwanted voltage control.

Figure 13:
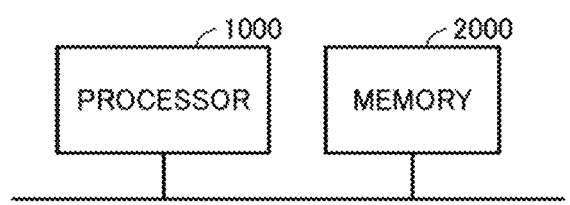
FIG. 13 is a diagram showing a configuration of a power controller when the functions of power conversion device 50 is implemented using software.

Operations corresponding to the operations of power conversion device 50 according to Embodiments 1 and 2 may be implemented in hardware for a digital circuit or software. If the functionality of power conversion device 50 is implemented using software, a power controller can include, for example, a processor 1000 and a memory 2000, as shown in FIG. 13, and processor 1000 can execute programs stored in memory 2000.

The presently disclosed embodiments should be considered in all aspects as illustrative and not restrictive. The scope of the present invention is indicated by the appended claims, rather than by the description above, and all changes that come within the scope of the claims and the meaning and range of equivalency of the claims are intended to be embraced within their scope.

REFERENCE SIGNS LIST

10 substation; 20 step voltage regulator (SVR); 30 central management device; 40 pole transformer; 50 power conversion device; 60 solar power generation; 70 storage battery; 80 load; 90 decentralized power supply system; 100 power conversion system; 101-*a*, 101-*b*, 101 voltage detector; 102-*a*, 102-*b*, 102 current detector; 310 correction unit; 320 command unit; 510 voltage detection unit; 520 voltage target value generation unit; 530 current detection unit; 540 control circuit; 550 power converter circuit; 560 memory; 1000 processor; 2000 memory; 5410 SVR action detection unit; 5420 voltage target value correction amount calculation unit; 5430 overvoltage output unit; 5431 limiter, 5432, 5492 subtractor; 5440 voltage control unit; 5491, 5493 adder; 5550 reactive power control unit; 5560 real power control unit; 5470 current control unit; 5480 voltage target value determination unit; 5490 deadband determination unit; and LA, LA2 power distribution grid.

The invention claimed is:

1. A power conversion system, comprising:
   an automatic voltage regulator installed in a power distribution grid; and
   at least one decentralized power supply system,
   the decentralized power supply system, including:
   a decentralized power supply; and
   a power conversion device,
   the power conversion device including:
   a power converter circuit to convert a direct-current power output from the decentralized power supply into an alternating-current power, and output the alternating-current power to the power distribution grid;
   a voltage detection unit to detect a voltage at a point of interconnection between the power converter circuit and the power distribution grid;
   a voltage target value generation unit to remove a high-frequency variation from a root mean square of the voltage detected by the voltage detection unit to generate a voltage target value;
   a correction unit to correct the voltage target value when the automatic voltage regulator has performed an action; and
   a command unit to command, when the voltage at the point of interconnection detected by the voltage detection unit deviates from a voltage control deadband referenced to the voltage target value, the power converter circuit to output a reactive power based on a magnitude of the deviated amount of voltage.

2. The power conversion system according to claim 1, wherein
   the correction unit detects that the automatic voltage regulator has performed an action, when an absolute value of a rate of change of the voltage at the point of interconnection detected by the voltage detection unit is above a first reference value and an absolute value of a varying amount of a real power output from the power converter circuit is less than a second reference value.

3. The power conversion system according to claim 2, wherein
   the correction unit detects that the automatic voltage regulator has performed an action, when the absolute value of the rate of change of the voltage at the point of interconnection detected by the voltage detection unit continues to be above the first reference value for a prescribed time period and the absolute value of the varying amount of the real power output from the power converter circuit is less than the second reference value.

4. The power conversion system according to claim 2, wherein
   when the correction unit detects that the automatic voltage regulator has performed an action, the correction unit corrects the voltage target value based on a voltage step width of the automatic voltage regulator.

5. The power conversion system according to claim 4, wherein
when the correction unit detects that the automatic voltage regulator has performed an action, the correction unit corrects the voltage target value by
adding an absolute value of the voltage step width of the automatic voltage regulator to the voltage target value when the rate of change of the voltage at the point of interconnection is positive, and
subtracting the absolute value of the voltage step width of the automatic voltage regulator from the voltage target value when the rate of change of the voltage at the point of interconnection is negative.

6. The power conversion system according to claim 1, wherein
the command unit includes:
a subtractor to output a deviation of the voltage at the point of interconnection from the voltage target value;
an overvoltage output unit to
output a difference between an absolute value of the deviation and the voltage control deadband when the absolute value of the deviation is above the voltage control deadband, and
output zero when the absolute value of the deviation is within or below the voltage control deadband; and
a voltage control unit to output a control amount as a reactive power command value, the control amount being obtained by amplifying output of the overvoltage output unit.

7. The power conversion system according to claim 6, wherein
the voltage control deadband is smaller than a voltage control deadband width for the automatic voltage regulator.

8. The power conversion system according to claim 7, comprising
a central management device to manage a state of the power distribution grid, wherein
the power conversion device receives information indicating the voltage control deadband, from the central management device.

9. The power conversion system according to claim 7, wherein
the command unit sets the voltage control deadband based on a distance between the power converter circuit and the automatic voltage regulator.

10. The power conversion system according to claim 1, wherein
the correction unit detects that the automatic voltage regulator has performed an action, when an absolute value of a rate of change of the voltage at the point of interconnection detected by the voltage detection unit is above a first reference value and less than a second reference value and an absolute value of a varying amount of a real power output from the power converter circuit is less than a third reference value.

11. The power conversion system according to claim 10, wherein
the correction unit detects that the automatic voltage regulator has performed an action, when the absolute value of the rate of change of the voltage at the point of interconnection detected by the voltage detection unit continues to be above the first reference value and less than the second reference value for a prescribed time period, and the absolute value of the varying amount of the real power output from the power converter circuit is less than the third reference value.

12. The power conversion system according to claim 10, wherein
when the correction unit detects that the automatic voltage regulator has performed an action, the correction unit
corrects the voltage target value to a voltage target value upper limit when the rate of change of the voltage at the point of interconnection is positive, and
corrects the voltage target value to a voltage target value lower limit when the rate of change of the voltage at the point of interconnection is negative.

13. The power conversion system according to claim 12, wherein
the correction unit sets the voltage target value upper limit and the voltage target value lower limit, based on the voltage target value and a voltage step width of the automatic voltage regulator.

14. A power conversion device in a power conversion system which includes an automatic voltage regulator installed in a power distribution grid and a decentralized power supply, the power conversion device, comprising:
a power converter circuit to convert a direct-current power output from the decentralized power supply into an alternating-current power, and output the alternating-current power to the power distribution grid;
a voltage detection unit to detect a voltage at a point of interconnection between the power converter circuit and the power distribution grid;
a voltage target value generation unit to remove a high-frequency variation from a root mean square of the voltage detected by the voltage detection unit to generate a voltage target value;
a correction unit to correct the voltage target value when the correction unit detects that the automatic voltage regulator has performed an action; and
a command unit to command, when the voltage at the point of interconnection detected by the voltage detection unit deviates from a voltage control deadband referenced to the voltage target value, the power converter circuit to output a reactive power based on a magnitude of the deviated amount of voltage.

* * * * *